Inventors
Jerome J. Kurland
Joseph J. Kurland
By Mann, Brown & McWilliams
Attys.

United States Patent Office 3,019,376
Patented Jan. 30, 1962

3,019,376
HIGH-TEMPERATURE MINIATURE CONDENSER CONSTRUCTION
Jerome J. Kurland, Chicago, and Joseph J. Kurland, Glencoe, Ill., assignors to Illinois Condenser Company, a corporation of Illinois
Filed Mar. 27, 1959, Ser. No. 802,477
5 Claims. (Cl. 317—242)

This invention relates to capacitors and, more particularly, is concerned with miniature type electrolytic capacitors. The principal object of the invention is to provide a hermetically sealed high-temperature electrolytic capacitor having a terminal structure that includes a solid encapsulation bead and having a wound capacitor pack disposed in endwise alignment with the terminal structure within a hollow retainer frame that includes end wall structure engageable to retain the pack and bead against endwise separation.

Another object of the invention is to provide a hermetically sealed, high-temperature, electrolytic capacitor having a terminal structure that includes a solid encapsulation bead and having a wound capacitor pack housed in endwise alignment with the terminal structure within a hollow, tubular can that includes end wall structure engageable to retain the pack and bead against endwise separation.

Still another object of the invention is to provide such a capacitor construction with a ring gasket in sealing compression between the encapsulation bead and the end wall structure of the frame to provide a mechanically rigid unit having a more complete hermetic seal.

Other objects and advantages will become apparent during the course of the following description.

In the accompanying drawings forming a part of this specification and in which like numerals are employed to designate like parts throughout the same:

Figures 1, 2, 3, 4:
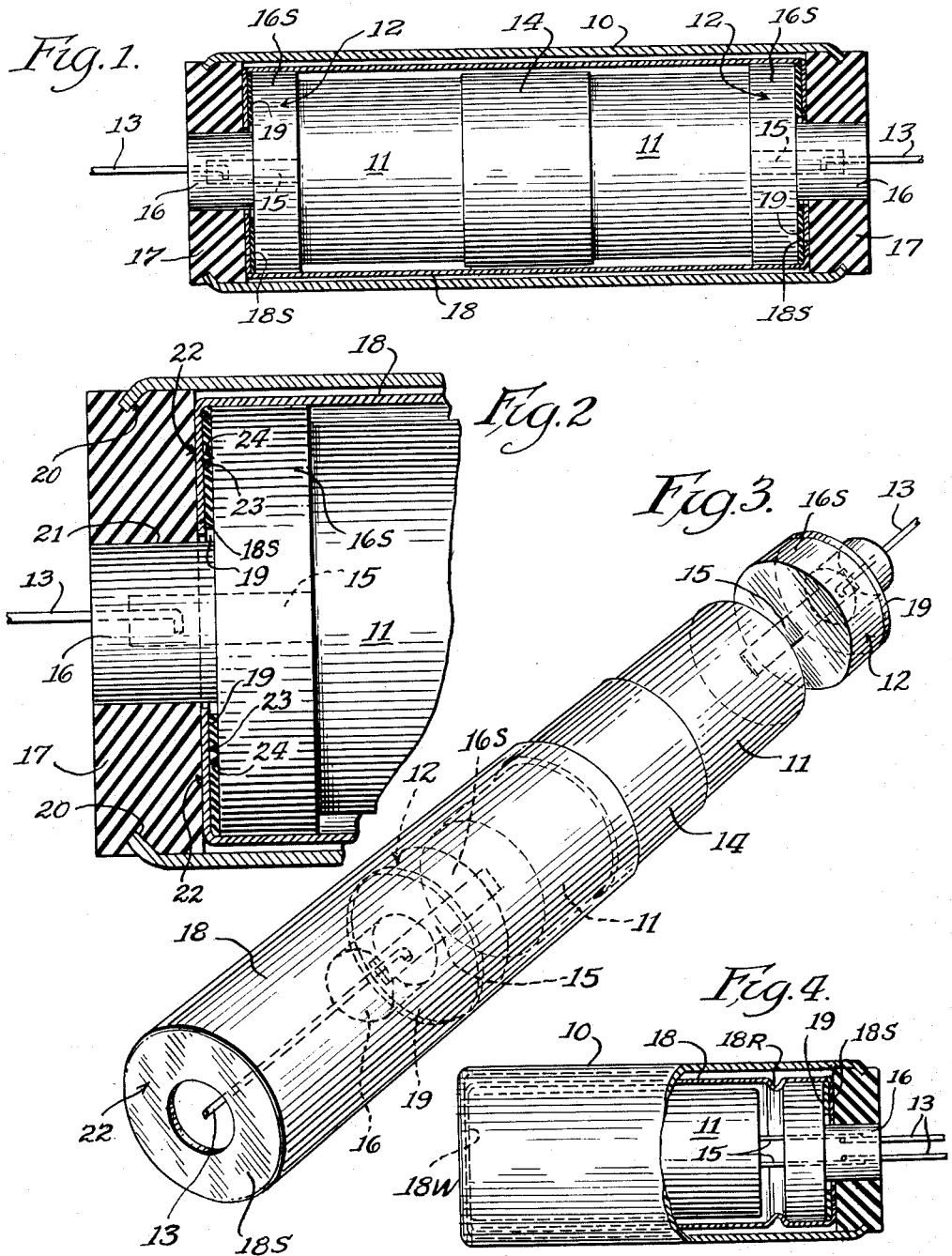
FIG. 1 is an enlarged longitudinal sectional view through a tubular type miniature capacitor construction in accordance with this invention.
FIG. 2 is a fragmentary enlarged sectional view through one end of the capacitor construction of FIG. 1.
FIG. 3 is a perspective view illustrating the mounting of the retainer frame around the assembly of the capacitor pack and terminal beads.
FIG. 4 is a side-elevational view of an upright type capacitor constructed in accordance with this invention, with the terminal structure being shown in section to facilitate the disclosure.

Referring now to the drawings, for purposes of disclosure the invention is illustrated in connection with the construction of a miniature type electrolytic capacitor, the completed form of a tubular capacitor wherein a terminal is brought out of each end being shown in FIG. 1 and the completed form of an upright capacitor wherein the terminals are brought out of the same end being shown in FIG. 4.

Referring now to FIG. 1, the tubular type capacitor includes a hollow, tubular casing 10 that is here shown in the form of an open-ended cylindrical metallic can that may have a wall thickness on the order of .008" to .015", a capacitor pack 11 suitably impregnated with electrolyte disposed in the casing, and separate cap structures, generally designated at 12, disposed in the open ends of the casing in endwise alignment with the pack and cooperating with the casing to completely surround and seal the pack. Each cap structure is provided with an external electrical connection terminal 13. As will be explained, a ceramic tube could be employed in lieu of the metallic can.

The capacitor pack 11 is conventional and may comprise a plurality of foils of aluminum or other suitable material arranged in alternating, overlying relation with a plurality of layers of paper insulation to form a stack that is suitably wound into cylindrical form and secured by an outer band of cellophane tape 14. As is conventional, a separate riser 15 in the form of a relatively wide, flat strip of aluminum is electrically connected with each foil and projects from the end of the pack for connection to one of the external connection wires 13, which may be of tin-coated copper or brass wire. The risers and connection wires are joined by spot-welding or equivalent means to provide a strong mechanical and electrical juncture of the dissimilar metals.

The cap structure 12 at each end of the capacitor includes a solid encapsulation bead 16 that completely surrounds, encases and seals the juncture and substantially spans the cross section of the casing. In the construction illustrated for purposes of disclosure, the encapsulation bead is larger at its inner end than at its outer end to define an annular external abutment shoulder 16S at its inner end and a resilient sleeve 17 of rubber or other suitable rubber-like material is in snug, telescoping relation over the outer end of the encapsulation bead and is disposed at least partially within the end of the casing. It is preferred that each cap structure project slightly beyond the end of the casing in order that the bent-over, inwardly projecting end of the casing may properly bite into the rubber sleeve 17 and set up radially and axially directed compression forces in the rubber sleeve for sealing the end of the casing. The exposed end of the rubber sleeve affords increased surface insulation between the connection terminals 13 and the casing 10.

Any dielectric material that can be cast and that is resistant to air and moisture and to chemical attack in the presence of various types of electrolytes is suitable for use in the formation of the encapsulation bead around the juncture of the riser and the lead wire. Certain resins, for example, are suitable: the epoxy resins, the polyester resins, and phenol and condensation resins.

Other desirable properties which the encapsulation material preferably should possess are high tensile and shock strength, excellent insulation resistance, stability at high temperatures, and stability in the presence of the various capacitor fill materials and any other materials that are employed in the fabrication of the capacitor. One or more of these last-mentioned properties may or may not be required, depending upon the particular application, as will be apparent to those skilled in the art.

While it is preferred that the encapsulation bead be formed of hard, incompressible insulation material, it may also be cast of rubber of rubber and plastic compounds such as are marketed under the trade name "Thiokol" by Thiokol Corp., as will be apparent to those skilled in this art.

In the fabrication of the capacitor of FIG. 1, resort may be had to the general techniques and equipment illustrated in our copending application, Serial No. 664,537, filed June 10, 1957, the disclosure of which, to the extent it is not inconsistent herewith, is specifically incorporated by reference.

According to the present invention, after their formation and assembly, the pack and cap structures are received in endwise alignment within a hollow frame 18 which, in the finished form of the capacitor, is provided with inwardly projecting, annular wall structure at each end to form substantially planar annular end shoulders 18S that overlie the outwardly facing surface of the bead shoulder 16S to react with it in limiting endwise separation of the beads and the pack.

In the preferred practice of the invention illustrated herein, the frame 18 is in the form of a thin-walled, hollow, metallic tube or can that is originally fully open at one end and that may have the annular shoulder at the other end formed by providing a complete closure wall and punching out a center opening. A ring gasket 19, in the form of a flat annulus, is provided between the cooperating shoulders 16S and 18S, respectively, of the beads and the frame. The gaskets 19 are under sufficient compression endwise or axially of the pack to create an effective seal with the beads so that the pack is substantially isolated within the inner can 18. It will be appreciated that the outer can or casing 10 cooperates in sealing engagement with the rubber sleeves 17 to provide an encasing jacket that is sealed completely around the assembly of the inner can and the encapsulation beads.

In the enlarged view of FIG. 2, the various seal regions are labelled to better illustrate the makeup of the improved seal. This seal structure is extremely important in view of the added difficulties arising in connection with high-temperature capacitor applications.

Numeral 20 indicates a seal region completely around the bent-over end of the outer can. Numeral 21 indicates a seal region completely around the outer end of the bead. Numerals 22 and 23, respectively, indicate a seal region completely around the outside and inside faces of the end shoulder 18S on the frame, and numeral 24 indicates a seal region completely around the outer face of the annular shoulder 16S of the encapsulation bead.

The construction of this disclosure also has the important advantage that the frame, which is here constituted by the inner metallic can 18, provides a rigid mechanical structure for resisting the pronounced tendency for the encapsulation beads to bulge outwardly through the end of the casing when the unit is subjected to high temperatures which generate gases in the electrolyte with which the capacitor pack is impregnated. Within limits, the internal pressures developed at high temperatures are beneficial in that they increase the sealing action of the ring gasket between the shoulders on the beads and the inner can. The inner can may have a wall thickness on the order of .005" to .007", and it has been possible to incorporate this inner can into existing miniature capacitor constructions without having to enlarge the casing. For convenience and clarity in the drawing disclosure, the radial clearance between the inner and outer cans has been exaggerated. In actual practice, however, this clearance may be substantially zero.

The assembly procedure for the present capacitor construction is described with reference to FIG. 3. A subassembly comprising a wound capacitor pack 11 and securing tape 14, the risers 15, lead wires 13, and encapsulation beads 16 is first formed and inserted into the inner can until the outer end of the corresponding encapsulation bead projects through the bottom end of the can. Since, in the illustrated arrangement, the end wall structure at the bottom end of the can is preformed, the ring gasket 19 is applied before the subassembly is inserted. With the upper ring gasket 19 in place, the fully open upper end of the can is provided with end wall structure by flanging the end of the can inwardly sufficiently to set up sealing compression forces in the ring gaskets 19. The rubber sleeves 17 are applied around the exposed outer ends of the encapsulation beads. This unit is then inserted in the outer casing 10 and the ends of the outer casing are flanged inwardly to bite into the rubber sleeves and compress them into radial sealing engagement with the encapsulation beads and into axial sealing engagement with the annular end wall structure.

It should be understood that the rubber sleeve terminal construction is principally for use when the outer casing 10 is in the form of a metallic can. However, the outer casing may be a ceramic tube, in which case the rubber sleeves are omitted and the ends of the casing are sealed to the encapsulation bead by adding additional mold material to fill the clearance space existing between the outer end of each bead and the open end of the ceramic tube. This technique is more fully described in our copending application, Serial No. 778,495, filed December 5, 1958, the disclosure of which, to the extent it is not inconsistent herewith, is specifically incorporated by reference.

While the shouldered form of encapsulation bead illustrated herein is preferred for convenience in assembling the parts and for providing sufficient metal-to-metal clearance and surface resistance when the end of the outer casing is bent over, it should be recognized that in the larger-diameter capacitors, a shoulderless bead may be employed and the outer casing may be bent inwardly across the outer face of the rubber sleeve that would again overlie the outer face of the end wall structure of the inner can that receives and retains the beads and pack against endwise separation.

Finally, in FIG. 4, the upright type high-pressure miniature capacitor of this invention is illustrated as having an inner reinforcement frame in the form of a metallic can 18, the bottom wall 18W of which may be unbroken and the top wall of which comprises an annular end shoulder 18S formed by flanging the can inwardly across the shoulder of the encapsulation bead after the pack and the bead are in place within the can. In the upright type, the inner can may be formed with a circular internal rib 18R positioned at a point adjacent the open end of the can for abutting engagement with the inner end of the encapsulation bead 16 so that the bead is securely gripped between the internal rib and the end shoulder of the inner can. Once again the bead is sealed within the outer casing through a rubber sleeve 17 when a metallic can is employed as the outer casing. In the case of a ceramic tube, the rubber sleeve could be replaced with a final encapsulation operation as described previously.

The construction disclosed herein has been thoroughly tested and proven satisfactory in applications where the capacitor unit is subjected to temperatures of more than 85° C. It has been found that the seal has not been impaired, and the tendency for the bead to bulge out the end of the casing is effectively resisted.

It should be understood that the description of the preferred form of the invention is for the purpose of complying with section 112, title 35, of the U.S. Code and that the claims should be construed as broadly as prior art will permit.

We claim:
1. In a hermetically sealed high-temperature capacitor construction, a capacitor pack having an external connection terminal projecting from one end thereof, an encapsulation of air and moisture-resistant insulating mold material surrounding and completely encasing an intermediate portion of each terminal to form a solid bead that completely seals said portion, said bead being larger at its inner end than at its outer end such that said inner end presents an endwise outwardly facing abutment surface, a hollow frame open at one end and housing the pack and bead in endwise alignment, said frame having annular wall structure at said one end overlying the said abutment surface on the inner end of the bead to react therewith in limiting endwise separation of the bead and pack, a resilient sleeve of rubber-like material in snug, telescoping relation over the outer end of the bead to abut against said annular wall structure, and a tubular external casing in telescoping relation over the frame and bead, said casing having wall structure at the bead end thereof projecting into the sleeve and compressing the sleeve into sealing engagement with the bead and with said annular wall structure.

2. In a hermetically sealed high-temperature capacitor construction, a capacitor pack having a riser projecting from one end thereof, an external terminal mechanically and electrically secured to said riser to form a juncture, an encapsulation of air and moisture-resistant insulating mold material surrounding and completely encasing said juncture to form a solid bead that completely seals said juncture, said bead being larger at its inner end than at its outer end and defining an endwise outwardly directed annular external abutment shoulder at its inner end, a ring gasket encircling the outer end of said bead to overlie and abut said shoulder, a hollow, thin-walled can open at one end and housing the pack and bead in endwise alignment, said can having a substantially planar annular wall structure at said one end overlying and compressing said gasket against said abutment shoulder at the inner end of said bead in a direction endwise of said pack, a resilient sleeve of rubber-like material snugly encircling the outer end of the bead, and a tubular external casing in telescoping relation over the can and bead, said casing having wall structure at the bead end thereof projecting into the sleeve and compressing the sleeve into sealing engagement with the bead and with said annular wall structure.

3. A hermetically sealed high-temperature miniature capacitor construction comprising a capacitor pack having risers projecting from opposite ends thereof, a separate external terminal mechanically and electrically secured to each riser to form a juncture, a separate encapsulation of air and moisture-resistant insulating mold material surrounding and completely encasing each juncture to form a solid bead that completely seals said juncture, each bead being larger at its inner end than at its outer end and defining an endwise outwardly directed annular external abutment shoulder at its inner end, a separate ring gasket encircling the outer end of each bead and overlying the abutment shoulder at the inner end thereof, a hollow can housing the pack and beads in endwise alignment and having annular wall structure at each end overlying and compressing the adjacent ring gasket against the shoulder of the adjacent bead in a direction endwise of the pack, a separate resilient sleeve of rubber-like material in snug, telescoping relation over the outer end of each bead to abut against the annular wall structure at the adjacent end of said can, and a tubular external casing in telescoping relation over the can and the beads, said casing, at each end, having wall structure projecting into engagement with the adjacent sleeve and compressing each sleeve into sealing engagement with its bead and with the end wall structure at the adjacent end of the can.

4. In a hermetically sealed high-temperature capacitor construction, a capacitor pack having an external connection terminal projecting from one end thereof, an encapsulation of air and moisture-resistant insulating mold material surrounding and completely encasing an intermediate portion of said terminal to form a solid bead that completely seals said portion, said bead being larger at its inner end than at its outer end to provide said inner end with an endwise outwardly facing annular abutment surface encircling its terminal, a ring gasket encircling the outer end of said bead and overlying said abutment surface on the inner end thereof, a hollow frame open at one end and receiving the pack and bead in endwise alignment, said frame having annular wall structure at said one end encircling the outer end of said bead and engaging the gasket overlying the abutment surface at the inner end of the bead to seal thereagainst in limiting endwise separation of the bead and pack, a tubular external casing in telescoping relation over the frame and bead, said casing being open at the bead end thereof, and means between the bead and the open end of the casing for hermetically sealing the open end of the casing.

5. In a hermetically sealed high-temperature capacitor construction, a capacitor pack having an external connection terminal projecting from one end thereof, an encapsulation of air and moisture-resistant insulating mold material surrounding and completely encasing an intermediate portion of the terminal to form a solid bead that completely seals said portion, said bead presenting an endwise outwardly facing annular marginal surface, a ring gasket encircling the outer end of said bead and overlying said marginal surface adjacent the inner end thereof, a can open at one end and housing the pack and bead in endwise alignment, said can having a retainer frame disposed therein to embrace said pack and bead for limiting endwise separation of the bead and pack, with said frame including annular wall structure at one end thereof encircling the outer end of said bead and engaging the gasket overlying the endwise outwardly facing marginal surface of the bead to seal thereagainst in limiting endwise separation of the bead and pack, and means including the bead for establishing a hermetic seal across the open end of the can.

References Cited in the file of this patent
UNITED STATES PATENTS

| | | |
|---|---|---|
| 2,803,693 | Kurland et al. | Aug. 20, 1957 |
| 2,891,362 | Bettridge | June 23, 1959 |
| 2,941,024 | Lamphier | June 14, 1960 |

FOREIGN PATENTS

| | | |
|---|---|---|
| 793,380 | Great Britain | Apr. 16, 1958 |